United States Patent
Guck et al.

(10) Patent No.: US 10,764,191 B2
(45) Date of Patent: Sep. 1, 2020

(54) DEVICE AND METHOD FOR MANAGING END-TO-END CONNECTIONS

(71) Applicant: Siemens Aktiengesellschaft, Munich (DE)

(72) Inventors: Jochen Guck, München (DE); Johannes Riedl, Ergolding (DE); Vivek Kulkarni, Unterhaching (DE); Wolfgang Kellerer, Fürstenfeldbruck (DE); Amaury Van Bemten, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/327,007

(22) PCT Filed: Aug. 22, 2016

(86) PCT No.: PCT/EP2016/069814
§ 371 (c)(1),
(2) Date: Feb. 21, 2019

(87) PCT Pub. No.: WO2018/036606
PCT Pub. Date: Mar. 1, 2018

(65) Prior Publication Data
US 2019/0207856 A1 Jul. 4, 2019

(51) Int. Cl.
*H04L 12/851* (2013.01)
*H04L 12/863* (2013.01)
(Continued)

(52) U.S. Cl.
CPC .............. *H04L 47/18* (2013.01); *H04L 47/24* (2013.01); *H04L 47/50* (2013.01); *H04L 47/781* (2013.01); *H04L 47/805* (2013.01)

(58) Field of Classification Search
None
See application file for complete search history.

(56) References Cited

U.S. PATENT DOCUMENTS 7,860,101 B2* 12/2010 Kekki ................. H04L 12/5601
370/395.1
10,097,329 B2* 10/2018 Chiang ................ H04L 5/0057
(Continued)

FOREIGN PATENT DOCUMENTS

| CN | 105357068 A | 2/1916 | ............. H04L 12/26 |
| CN | 105516312 A | 4/1916 | ............. H04L 29/08 |

(Continued)

OTHER PUBLICATIONS

Chinese Office Action, Application No. 201680089498.0, 6 pages, dated Jan. 30, 2020.

*Primary Examiner* — Ajit Patel
(74) *Attorney, Agent, or Firm* — Slayden Grubert Beard PLLC

(57) ABSTRACT

Some embodiments include a device for managing end-to-end connections of a network including a plurality of end-to-end connections with assigned queues including a data flow having data packets to be transmitted collectively comprising: a processor; a state unit to provide a current status of a quality of service parameter of a queue to which a new data flow is to be allocated; a resource allocation unit to allocate the new data flow to the queue based on a threshold for the quality of service parameter for the queue and the current status of the quality of service parameter of the queue; and a routing unit to route the data packets of the new data flow based on the allocation.

13 Claims, 1 Drawing Sheet

(51) Int. Cl.
*H04L 12/801* (2013.01)
*H04L 12/911* (2013.01)
*H04L 12/927* (2013.01)

(56) References Cited

U.S. PATENT DOCUMENTS

| | | | |
|---|---|---|---|
| 2003/0103465 A1* | 6/2003 | Counterman | H04L 47/10 370/252 |
| 2004/0120336 A1* | 6/2004 | Hendel | H04L 47/24 370/412 |
| 2004/0136379 A1* | 7/2004 | Liao | H04L 47/10 370/395.21 |
| 2006/0182119 A1* | 8/2006 | Li | H04L 45/04 370/395.52 |
| 2009/0219912 A1* | 9/2009 | Wengerter | H04L 47/14 370/345 |
| 2011/0261688 A1 | 10/2011 | Sharma et al. | 370/230 |
| 2012/0076103 A1* | 3/2012 | Dai | H04W 72/1289 370/329 |
| 2014/0146682 A1 | 5/2014 | Kakadia et al. | 370/238 |
| 2015/0063112 A1 | 3/2015 | Wu et al. | 370/235 |

FOREIGN PATENT DOCUMENTS

| | | | |
|---|---|---|---|
| CN | 103346922 A | 10/2013 | H04L 12/24 |
| CN | 104053183 A | 9/2014 | H04W 28/02 |

* cited by examiner

DEVICE AND METHOD FOR MANAGING END-TO-END CONNECTIONS

CROSS-REFERENCE TO RELATED APPLICATIONS

This application is a U.S. National Stage Application of International Application No. PCT/EP2016/069814 filed Aug. 22, 2016, which designates the United States of America, the contents of which are hereby incorporated by reference in their entirety.

TECHNICAL FIELD

The present disclosure relates to central network management. Various embodiments may include devices for managing end-to-end connections of a network within a central network management entity and/or methods for managing end-to-end connections of a network within a central network management entity.

BACKGROUND

In industrial communications, deterministic/stochastic guarantees may be needed for their end-to-end real-time requirements. To provide this, corresponding systems may use specialized forwarding hardware. In order to lower the cost of real-time communication systems, a centralized control plane mechanism may be used to provide Quality of Service (QoS) guarantees with off-the-shelf packet-switched Ethernet hardware.

Another approach is a function split concept which separates the resource allocation (e.g. buffer size and data rate) and the routing of a flow (real-time flow embedding) as two distinct sub-problems. Both, the resource allocation and the flow routing, are done on a queue-level basis. This means that a queue-level topology is used which defines queues per link. Resource allocation is done for each link of the queue-level graph and routing is done on the queue-level graph. That is, resources are allocated to queues and the routing of a flow consists in both choosing the physical links followed by the flow and, for each link, the queue at which the flow will be buffered. In order to be able to compute worst-case delays, a particular reservation of resources at the network queues is needed. As a result, the flow embedding relies on a resource-based access control mechanism, i.e. a mechanism deciding whether or not enough resources are still available at a queue in order to route a new flow through this queue. As multiple resources (e.g. buffer and data rate) influence the delay of a queue, solving the resource allocation problem in an optimal way is very challenging.

SUMMARY

The teachings of the present disclosure describe a simplified approach for managing end-to-end connections. For example, some embodiments may include a device (10) for managing end-to-end connections of a network (20) within a central network management entity, the network (20) including a plurality of end-to-end connections, wherein queues (23, 24, 25) are assigned to the end-to-end connections, wherein each of the queues (23, 24, 25) includes a data flow having data packets to be transmitted collectively, the device (10) comprising: a state unit (1) for providing a current status of a quality of service parameter of a queue (23, 24, 25) to which a new data flow (22) is to be allocated, a resource allocation unit (2) for allocating the new data flow (22) to the queue (23, 24, 25) based on a threshold for the quality of service parameter for the queue (23, 24, 25) and the current status of the quality of service parameter of the queue (23, 24, 25), and a routing unit (3) for routing the data packets of the new data flow (22) based on the allocation.

In some embodiments, the resource allocation unit (2) is adapted to calculate a worst-case value of the quality of service parameter for the queue (23, 24, 25) based on the current status of the quality of service parameter of the queue (23, 24, 25) and the new data flow (22) to be added.

In some embodiments, the worst-case value of the quality of service parameter for the queue (23, 24, 25) is based on the current status of the quality of service parameter of each queue (23, 24, 25) of the corresponding end-to-end connection.

In some embodiments, the resource allocation unit (2) is adapted to compare the threshold for the quality of service parameter for the queue (23, 24, 25) and the worst-case value of the quality of service parameter of the queue (23, 24, 25) and to allocate the new data flow (22) to the queue (23, 24, 25) when the worst-case value of the quality of service parameter is below the threshold.

In some embodiments, the resource allocation unit (2) is adapted to reject the new data flow (22) when the worst-case value of the quality of service parameter is above the threshold.

In some embodiments, a plurality of queues (23, 24, 25) is assigned to an end-to-end connection, wherein each of the queues (23, 24, 25) has a different priority, and wherein the resource allocation unit (2) is adapted to compare the threshold for the quality of service parameter and the worst-case value of the quality of service parameter of the queue (23, 24, 25) to which the new data flow (22) is to be allocated and is adapted to compare the threshold for the quality of service parameter and the worst-case value of the quality of service parameter of each queue (23, 24, 25) having a lower priority than the queue (23, 24, 25) to which the new data flow (22) is to be allocated.

In some embodiments, the state unit (1) is adapted to update the current status of the quality of service parameter of the queue (23, 24, 25) to which the new data flow (22) is allocated.

In some embodiments, the resource allocation unit (2) is adapted to allocate the new data flow (22) to the queue (23, 24, 25) based on available network resources.

In some embodiments, the network resources include at least one of a data rate and a buffer size.

In some embodiments, the resource allocation unit (2) is adapted to determine whether network resources are available for allocating the new data flow (22) to the queue (23, 24, 25), and if not, to reject the new data flow (22).

In some embodiments, the quality of service parameter is at least one of delay, error rates, bit rate, throughput, and jitter.

In some embodiments, the resource allocation unit (2) is adapted to allocate the new data flow (22) to the queue (23, 24, 25) based on at least two quality of service parameters.

In some embodiments, there is a modeling unit (4) for providing a model of the network (20) to the state unit (1) based on an input signal of the resource allocation unit (2) and the routing unit (3), wherein the modeling unit (4), the state unit (1) and the resource allocation unit (2) form a first loop and wherein the modeling unit (4), the state unit (1) and the routing unit (3) form a second loop.

In some embodiments, the state unit (1), the resource allocation unit (2), the routing unit (3) and the modeling unit (4) are located in a control plane of the network (20).

As another example, some embodiments may include a method for managing end-to-end connections of a network (20) within a central network management entity, the network (20) including a plurality of end-to-end connections, wherein queues (23, 24, 25) are assigned to the end-to-end connections, wherein each of the queues (23, 24, 25) includes a data flow having data packets to be transmitted collectively, the method comprising: providing (301) a current status of a quality of service parameter of a queue (23, 24, 25) to which a new data flow (22) is to be allocated, allocating (302) the new data flow (22) to the queue (23, 24, 25) based on a threshold for the quality of service parameter for the queue (23, 24, 25) and the current status of the quality of service parameter of the queue (23, 24, 25), and routing (303) the data packets of the new data flow (22) based on the allocation.

BRIEF DESCRIPTION OF THE DRAWINGS

Further embodiments, features, and advantages of the teachings of the present disclosure will become apparent from the subsequent description, taken in conjunction with the accompanying drawings, in which.

In the Figures, like reference numerals designate like or functionally equivalent elements, unless otherwise indicated.

DETAILED DESCRIPTION

Figure 1:
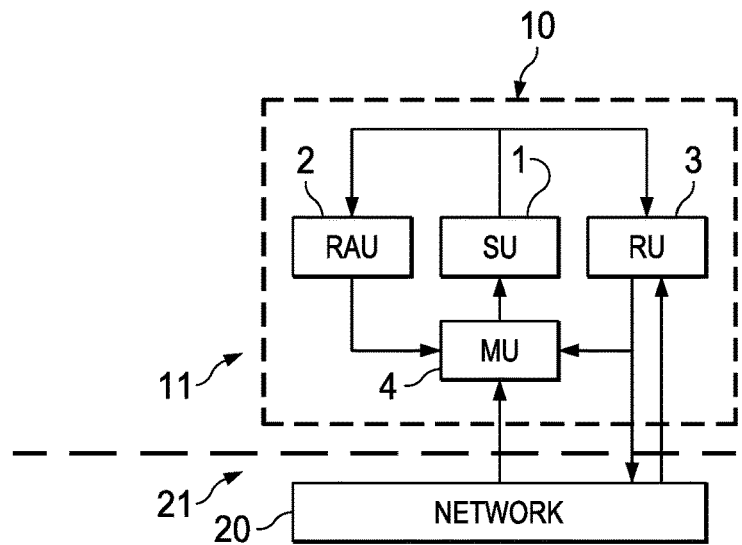
FIG. 1 shows a schematic block diagram of a device for managing end-to-end connections of a network within a central network management entity, incorporating teachings of the present disclosure.

For example, some embodiments may include a device for managing end-to-end connections of a network within a central network management entity. The network includes a plurality of end-to-end connections. Queues are assigned to the end-to-end connections, wherein each of the queues includes a data flow having data packets to be transmitted collectively. The device comprises a state unit for providing a current status of a quality of service parameter of a queue to which a new data flow is to be allocated, a resource allocation unit for allocating the new data flow to the queue based on a threshold for the quality of service parameter for the queue and the current status of the quality of service parameter of the queue, and a routing unit for routing the data packets of the new data flow based on the allocation.

The respective unit, e.g. the state unit, may be implemented in hardware and/or in software. If said unit is implemented in hardware, it may be embodied as a device, e.g. as a computer or as a processor or as a part of a system, e.g. a computer system. If said unit is implemented in software it may be embodied as a computer program product, as a function, as a routine, as a program code or as an executable object.

Using the device described above, it is possible to employ a smart mechanism for managing end-to-end connections with quality of service (QoS) guarantees in a central network management entity for steering the network to provide the QoS guarantees. The central network management entity may be for example an SDN (software defined networking) controller.

The device uses only one quality of service parameter for allocating new data flows to queues instead of using several network resources, like data rate and buffer size, and to calculate the quality of service parameter. This provides a simplified and less complex approach than the use of two network resources as one dimension of the resource allocation problem is removed.

At the same time, the overall routing is split into a routing unit and corresponding loop and a resource allocation unit and a corresponding loop, which reduces the complexity of routing. This split enables the routing of data packet flows with end-to-end QoS constraints like delay, loss, etc. by having a moderate computational complexity and a deterministic response time. This is the case as two algorithms can be used, one for the routing unit and the corresponding loop and one for the resource allocation unit and the corresponding loop.

Communication services in this context may refer to any services that have specific QoS requirements. These requirements may be for example delay, loss, or jitter of any data packets of the respective communication service. The routing unit handles these communication services and corresponding communication requests.

To guarantee hard real-time requirements, known systems use special-purpose forwarding hardware. For example, some systems use a time division multiple access (TDMA) method or a special ring structure. Using the function split concept as described above, the responsibility for real-time guarantees is shifted from the forwarding plane to the control plane. A mathematical modeling, on a queue-level, of the forwarding plane behavior is done. Based on this, the allocation of resources to individual queues and the routing of flow through the different queues of the network are identified as two separate sub-problems. This means that instead of a control loop that is closed over the forwarding and control planes, a queue-link model is used to keep the control loop within the control plane. Queue-link model may denote that data packets to be transmitted collectively are arranged in queues. Each queue has a specific QoS behavior. One or more queues are assigned to one end-to-connection. An end-to-end connection may consist of one or more links and one or more nodes, wherein a link in this context denotes a connection between two nodes.

When a new data flow is to be added, e.g. the new data flow should be transmitted from one node to another representing an end-to-end connection, the state unit determines a current status of a quality of service parameter of a queue to which a new data flow is to be allocated. The quality of service parameter denotes an end-to-end quality of service parameter.

The resource allocation unit then allocates the new data flow to the queue based on a threshold for the quality of service parameter for the queue, e.g. a maximum value which the quality of service parameter is allowed to obtain, and the current status of the quality of service parameter of the queue.

The threshold may be a deterministic threshold which the quality of service parameter is not allowed to exceed or to fall below at any time. In some embodiments, the threshold may be a stochastic threshold which the quality of service parameter is not allowed to exceed or to fall below on average. When using a stochastic threshold, the quality of service parameter may sometimes exceed the threshold or fall below the threshold, as long as an average value of the quality of service parameter does not exceed or fall below the threshold.

After the allocation via the resource allocation unit, after adding the new data flow to one queue, the routing unit can route the data packets of the new data flow based on the allocation. Thus, in contrast to known systems in which buffer space and data rate are assigned to each queue in the network, which allows to compute a static worst-case delay for each queue, the suggested device provides an allocation of data flows to queues based on an end-to-end quality of service parameter. Assigning the end-to-end parameter to queues instead of real resources (e.g. buffer size and data rate) facilities the resource allocation problem. Indeed, the optimization involves only a single parameter instead of two. Furthermore, pre-assigning resources could lead to sub-optimal network utilization if these resources are not fully utilized where they are assigned. The approach of the suggested device uses resources when they are needed until the threshold, for example a delay border, is violated. This leads to an overall better utilization of the network resources because resources are not reserved when not needed.

In some embodiments, the resource allocation unit provides instructions to calculate a worst-case value of the quality of service parameter for the queue based on the current status of the quality of service parameter of the queue and the new data flow to be added. Thus, the quality of service parameter is calculated as the worst value which could occur also with some minor variations of the quality of service parameter.

In some embodiments, the worst-case value of the quality of service parameter for the queue is based on the current status of the quality of service parameter of each queue of the corresponding end-to-end connection. Not only the quality of service parameter of the queue to which the new data flow is to be added but also the quality of service parameter of every queue of this end-to-end connection is taken into account. The quality of service parameters of each queue influence each other. For example, if the delay of one queue increases, this increases also the delay of the other queues. Thus, the worst-case value depends on the quality of service parameters of all queues.

In some embodiments, the resource allocation unit provides instructions to compare the threshold for the quality of service parameter for the queue and the worst-case value of the quality of service parameter of the queue and to allocate the new data flow to the queue when the worst-case value of the quality of service parameter is below the threshold.

In some embodiments, the resource allocation unit provides instructions to reject the new data flow when the worst-case value of the quality of service parameter is above the threshold. In order to guarantee the chosen quality of service threshold (dx) per queue, the access control mechanism calculates online, based on the current state of each queue, their current worst-case value (tx). If adding a new flow to a queue leads to a worst-case value which is higher than the pre-assigned threshold (tx>dx), the flow cannot be accepted because it would potentially violate the end-to-end guarantees provided to already embedded flows. Otherwise (if tx≤dx), the flow can be accepted.

In some embodiments, a plurality of queues is assigned to an end-to-end connection, wherein each of the queues has a different priority, and the resource allocation unit provides instructions to compare the threshold for the quality of service parameter and the worst-case value of the quality of service parameter of the queue to which the new data flow is to be allocated and is adapted to compare the threshold for the quality of service parameter and the worst-case value of the quality of service parameter of each queue having a lower priority than the queue to which the new data flow is to be allocated.

Priority in this case denotes the priority of data flows. For example, voice messages have a higher priority than data flows. High priority queues have to check whether or not it violates the threshold of lower priority queues. The state of a queue depends on the flows going through it but also on the state of higher priority queues. Adding a flow to the highest priority queue will increase the quality of service parameter of lower priority queues. Thus, high priority queues may check their own threshold and, if it is not violated, then ask to lower priority queues if it is also fine for their threshold. If none of the thresholds of the queues is violated, the flow can be accepted. The lowest priority queue has to check only its own threshold.

In some embodiments, the state unit provides instructions to update the current status of the quality of service parameter of the queue to which the new data flow is allocated. The updated status can then be used for a further resource allocation. Thus, the resource allocation unit can always allocate new data flows depending on the current status of the quality of service parameter of the queues.

In some embodiments, the resource allocation unit provides instructions to allocate the new data flow to the queue based on available network resources. The network resources include in particular at least one of a data rate and a buffer size. Thus, in addition to the quality of service parameters, the resource allocation unit can take into account available network resources, and can consider the actual present resources, such as bandwidth.

In some embodiments, the resource allocation unit provides instructions to determine whether network resources are available for allocating the new data flow to the queue, and if not, to reject the new data flow. If the queue has no network resources available or at least not in the amount as needed for the new data flow, the resource allocation unit can reject the new data flow.

In some embodiments, the quality of service parameter is at least one of delay, error rates, bit rate, throughput, and jitter. The quality of service parameters are used to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications such as voice over IP, online games and IP-TV, since these often require fixed bit rate and are delay sensitive, and in networks where the capacity is a limited resource, for example in cellular data communication.

In some embodiments, the resource allocation unit provides instructions to allocate the new data flow to the queue based on at least two quality of service parameters. The quality of service parameter can be checked in parallel or one after the other. For example, if a new data flow would be accepted and allocated when taking into account a worst-case delay, the resource allocation unit can subsequently check the error rate or jitter and decide again whether to allocate the new data flow or not.

In some embodiments, the device comprises a modeling unit for providing a model of the network to the state unit based on an input signal of the resource allocation unit and the routing unit, wherein the modeling unit, the state unit, and the resource allocation unit form a first loop and wherein the modeling unit, the state unit, and the routing unit form a second loop.

The overall routing is split into a routing unit and corresponding loop and a resource allocation unit and a corresponding loop, the complexity of routing can be reduced. As two algorithms can be used, one for the routing unit and the corresponding loop and one for the resource allocation unit and the corresponding loop, the computational complexity can be reduced and a deterministic response time can be achieved.

In some embodiments, the state unit, the resource allocation unit, the routing unit and the modeling unit are located in a control plane of the network. As a basis, instead of a control loop that is closed over the forwarding and control planes, the control loops are kept within the control plane. Thus, low cost commodity hardware may be used in the forwarding plane, i.e., the plane being responsible for forwarding data packets within the network, as the forwarding plane does not need to provide a complex functionality.

In some embodiments, there is a method for managing end-to-end connections of a network within a central network management entity. The network includes a plurality of end-to-end connections, wherein queues are assigned to the end-to-end connections, wherein each of the queues includes a data flow having data packets to be transmitted collectively. The method comprises the following steps: providing a current status of a quality of service parameter of a queue to which a new data flow is to be allocated, allocating the new data flow to the queue based on a threshold for the quality of service parameter for the queue and the current status of the quality of service parameter of the queue, and routing the data packets of the new data flow based on the allocation.

The embodiments and features described with reference to devices apply mutatis mutandis to the methods.

In some embodiments, there is a computer program product comprising a program code for executing the above-described method for managing end-to-end connections when run on at least one computer. A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

FIG. 1 shows a device 10 for managing end-to-end connections of a network 20. The device 10 may be part of a central network management entity. The network 20 includes a plurality of end-to-end connections, wherein queues 23, 24, 25 are assigned to the end-to-end connections, wherein each of the queues 23, 24, 25 includes a data flow having data packets to be transmitted collectively.

The device 10 comprises a state unit 1, a resource allocation unit 2, a routing unit 3 and a modeling unit 4. All four units 1, 2, 3 and 4 are arranged within a control plane 11, wherein the network itself provides a forwarding plane 21. Thus, the network 20 can be less complex as the control is completely arranged within the control plane 11. The modeling unit 4, the state unit 1 and the resource allocation unit 2 form a first loop. The modeling unit 4, the state unit 1 and the routing unit 3 form a second loop.

The modeling unit 4 provides a model of the network, i.e., the available network resources. The modeling unit 4 receives an input from the network 20 itself, the resource allocation unit 2 and the routing unit 3. The state unit 1 provides a current status of a quality of service parameter of a queue. This is done based on information from the modeling unit 4.

The resource allocation unit 2 allocates the new data flow 22 to the queue 23, 24, 25 based on a threshold for the quality of service parameter for the queue 23, 24, 25 and the current status of the quality of service parameter of the queue 23, 24, 25. The routing unit 3 routes the data packets of the new data flow 22 based on the allocation.

Figure 2:
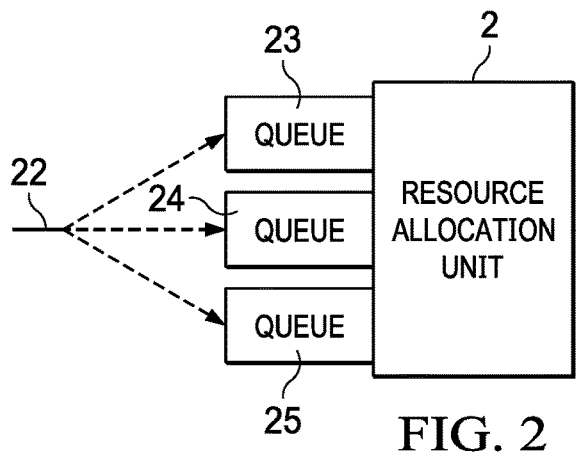
FIG. 2 shows a schematic data flow within the device of FIG. 1.

FIG. 2 shows an example of a priority scheduling, when queues 23, 24, 25 are provided for an end-to-end connection which have different priorities. In this case, queue 23 has a high priority, queue 24 has a middle priority and queue 25 has a low priority.

A new data flow 22 is to be added for example to queue 23. The priority scheduling is done by the resource allocation unit 2 according to the resource allocation as explained in FIG. 1.

The resource allocation will be now described with reference to FIG. 2 in the case of delay as quality of service parameter.

The resource allocation unit 2 determines for the new data flow 22, whether the delay threshold $d_h$ of the high priority queue is violated based on the current state $S_h$ of this queue and a corresponding worst-case delay $t_h$. If not, the resource allocation unit 2 determines for the new data flow 22, whether the delay threshold $d_m$ of the middle priority queue is violated based on the current state $S_m$ of this queue and a corresponding worst-case delay $t_m$. If not, the resource allocation unit 2 determines for the new data flow 22, whether the delay threshold $d_1$ of the low priority queue is violated based on the current state $S_1$ of this queue and a corresponding worst-case delay $t_1$. If the delay threshold $d_1$ of the low priority queue is also not violated, the new data flow is allocated to the high priority queue.

This is done as adding a data flow to one queue influences also the quality of service parameters of the queues with lower priorities. Thus, when adding a new data flow 22 to the high priority queue 23, also the quality of service parameters of the lower priority queues 24, 25 are checked for the case that the new data flow 22 would be added to the high priority queue 23.

Figure 3:
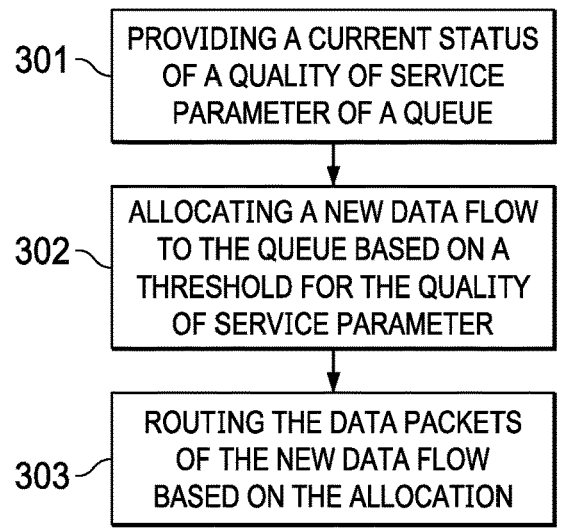
FIG. 3 shows a sequence of method steps of a method for managing end-to-end connections of a network within a central network management entity, incorporating teachings of the present disclosure.

FIG. 3 shows a method for managing end-to-end connections of a network 20 within a central network management entity. The method comprises the following:

In step 301, a current status of a quality of service parameter of a queue 23, 24, 25, to which a new data flow 22 is to be allocated, is provided.

In step 302, the new data flow 22 is allocated to the queue 23, 24, 25 based on a threshold for the quality of service parameter for the queue 23, 24, 25 and the current status of the quality of service parameter of the queue 23, 24, 25.

In step 303, the data packets of the new data flow 22 are routed based on the allocation.

Although the teachings of the present disclosure have been described in accordance with certain embodiments, it is obvious for the person skilled in the art that modifications are possible in all embodiments.

What is claimed is:

1. A device for managing end-to-end connections of a network within a central network management entity, the network including a plurality of end-to-end connections, wherein queues are assigned to the end-to-end connections, wherein each of the queues includes a data flow having data packets to be transmitted collectively, the device comprising:
  a processor;
  a state unit including instructions, the instructions, when loaded and executed by the processor, configure the processor to provide a current status of a quality of service parameter of a queue to which a new data flow is to be allocated;
  a resource allocation unit including instructions, the instructions, when loaded and executed by the processor, configure the processor to:
    allocate the new data flow to the queue based on a threshold for the quality of service parameter for the queue and the current status of the quality of service parameter of the queue;
    calculate a worst-case value of the quality of service parameter for the queue based on the current status of the quality of service parameter of the queue and the new data flow to be added; and
    compare the threshold for the quality of service parameter for the queue and the worst-case value of the quality of service parameter of the queue and to allocate the new data flow to the queue when the worst-case value of the quality of service parameter is below the threshold;
  a routing unit including instructions, the instructions, when loaded and executed by the processor, configure the processor to route the data packets of the new data flow based on the allocation.

2. The device according to claim 1, wherein the worst-case value of the quality of service parameter for the queue is based on the current status of the quality of service parameter of each queue of the corresponding end-to-end connection.

3. The device according to claim 1, wherein the resource allocation unit further includes instructions, the instructions, when loaded and executed by the processor, configure the processor to reject the new data flow when the worst-case value of the quality of service parameter is above the threshold.

4. The device according to claim 1, wherein:
  a plurality of queues is assigned to an end-to-end connection and each of the queues has a different priority; and
  the resource allocation unit further includes instructions, the instructions, when loaded and executed by the processor, configure the processor to compare the threshold for the quality of service parameter and the worst-case value of the quality of service parameter of the queue to which the new data flow is to be allocated and is adapted to compare the threshold for the quality of service parameter and the worst-case value of the quality of service parameter of each queue having a lower priority than the queue to which the new data flow is to be allocated.

5. The device according to claim 1, wherein the state unit further includes instructions, the instructions, when loaded and executed by the processor, configure the processor to update the current status of the quality of service parameter of the queue to which the new data flow is allocated.

6. The device according to claim 1, wherein the resource allocation unit further includes instructions, the instructions, when loaded and executed by the processor, configure the processor to allocate the new data flow to the queue based on available network resources.

7. The device according to claim 6, wherein the network resources include at least one of a data rate and a buffer size.

8. The device according to claim 6, wherein the resource allocation unit further includes instructions, the instructions, when loaded and executed by the processor, configure the processor to determine whether network resources are available for allocating the new data flow to the queue, and if not, to reject the new data flow.

9. The device according to claim 1, wherein the quality of service parameter comprises at least one of delay, error rates, bit rate, throughput, and jitter.

10. The device according to claim 1, wherein the resource allocation unit further includes instructions, the instructions, when loaded and executed by the processor, configure the processor to allocate the new data flow to the queue based on at least two quality of service parameters.

11. The device according to claim 1, further comprising a modeling unit including instructions, the instructions, when loaded and executed by the processor, configure the processor to provide a model of the network to the state unit based on an input signal of the resource allocation unit and the routing unit;
  wherein the modeling unit, the state unit, and the resource allocation unit form a first loop; and
  the modeling unit, the state unit, and the routing unit form a second loop.

12. The device according to claim 11, wherein the state unit, the resource allocation unit, the routing unit, and the modeling unit are located in a control plane of the network.

13. A device for managing end-to-end connections of a network within a central network management entity, the network including a plurality of end-to-end connections, wherein queues are assigned to the end-to-end connections, wherein each of the queues includes a data flow having data packets to be transmitted collectively, the device comprising:
  a processor;
  a state unit including instructions, the instructions, when loaded and executed by the processor, configure the processor to provide a current status of a quality of service parameter of a queue to which a new data flow is to be allocated;
  a resource allocation unit including instructions, the instructions, when loaded and executed by the processor, configure the processor to:
    allocate the new data flow to the queue based on a threshold for the quality of service parameter for the queue and the current status of the quality of service parameter of the queue; and
  a routing unit including instructions, the instructions, when loaded and executed by the processor, configure the processor to route the data packets of the new data flow based on the allocation;
  wherein a plurality of queues is assigned to an end-to-end connection and each of the queues has a different priority; and
  the resource allocation unit further includes instructions, the instructions, when loaded and executed by the processor, configure the processor to compare the threshold for the quality of service parameter and the worst-case value of the quality of service parameter of the queue to which the new data flow is to be allocated and is adapted to compare the threshold for the quality of service parameter and the worst-case value of the quality of service parameter of each queue having a lower priority than the queue to which the new data flow is to be allocated.

\* \* \* \* \*